(12) United States Patent
Maejima

(10) Patent No.: US 6,215,315 B1
(45) Date of Patent: Apr. 10, 2001

(54) FLAT CABLE WEAR AND FAULT DETECTION FOR LIBRARY APPARATUS

(75) Inventor: Mitsuru Maejima, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/182,686

(22) Filed: Oct. 30, 1998

(30) Foreign Application Priority Data

Feb. 27, 1998 (JP) .................................................. 10-046747

(51) Int. Cl.$^7$ ................................................... H01H 31/02
(52) U.S. Cl. ............................ 324/539; 360/69; 369/178
(58) Field of Search ........................... 360/69, 71, 82; 324/500, 522, 523, 527, 539, 133, 537; 369/34, 36, 178

(56) References Cited

U.S. PATENT DOCUMENTS 4,998,069 * 3/1991 Nguyen et al. ....................... 324/539
5,834,942 * 11/1998 De Angelis .......................... 324/522
5,936,796 * 8/1999 Haneda ................................. 360/92

FOREIGN PATENT DOCUMENTS 08235729  9/1996 (JP) .

* cited by examiner

Primary Examiner—Andrew L. Sniezek
Assistant Examiner—Dan I. Davidson
(74) Attorney, Agent, or Firm—Greer, Burns & Crain, Ltd.

(57) ABSTRACT

A library apparatus includes an accessor robot and a flat cable connected to the accessor robot. The flat cable has an outer check line and an inner check line each formed of a conductor. Breaks in each of the outer check line and the inner check line are detected to identify wear on the flat cable, and prevent sudden failure of the library apparatus.

15 Claims, 14 Drawing Sheets

FLAT CABLE WEAR AND FAULT DETECTION FOR LIBRARY APPARATUS

The present invention relates to a library apparatus having a plurality of cells each for storing a cartridge in which a recording medium is contained, and more particularly to apparatus for detecting wear and breakage in a flat cable connected between an accessor and a fixed location in the library apparatus.

BACKGROUND OF THE INVENTION

A library apparatus has a plurality of cells each for storing a cartridge such as a magnetic tape cartridge or an optical disk cartridge in which an information recording medium is contained. The cartridge stored in any cell selected from the plural cells is loaded into a drive unit provided in the library apparatus. Then, information processing is carried out on the medium contained in the loaded cartridge by the drive unit. More specifically, information recording and/or reproduction is carried out on the medium by the drive unit.

The library apparatus usually has a cartridge access station (CAS) for allowing insertion and ejection of the cartridge. The library apparatus further has an accessor robot acting on the cartridge to transfer the cartridge among the cartridge accessor station, each cell, and the drive unit.

In a large-scale library apparatus, the accessor robot is moved along at least one straight line in the horizontal direction, to enable efficient transfer of the cartridge.

For example, in a library apparatus described in Japanese Patent Laid-open No. 8235729, an accessor robot is moved by a drive force of its own motor along a straight rail extending in a horizontal direction.

To supply electric power to the accessor robot or transfer a control signal, a flat cable is connected to the accessor robot. In a large-scale library apparatus, the accessor robot moves over 20 m in some cases, and accordingly the flat cable tends to become long, so the apparatus must handle such a long flat cable well.

To apply a given tension to the flat cable and thereby prevent slack of the flat cable irrespective of a moving position of the accessor robot, a wire rope and an idler pulley (running pulley) may be used, for example. One end of the wire rope is connected to a housing of the library apparatus, and the other end of the wire rope is connected to the accessor robot. When the accessor robot moves a certain distance, the idler pulley moves half the distance. Accordingly, by wrapping the flat cable around a cable drum moving with the idler pulley, fixing one end of the flat cable to the accessor robot, and fixing the other end of the flat cable to the housing, a constant tension is always applied to the flat cable.

In the case of supplying electric power to the accessor robot or transferring a control signal by using the flat cable connected to the accessor robot, at least part of the flat cable is moved with the accessor robot, so that mechanical damage to the flat cable is expected. For example, when a feeder mechanism including the idler pulley and the cable drum mentioned above is adopted, the flat cable may be worn or damaged by the friction between it and the cable drum.

In the event that damage to the flat cable progresses, a signal line pattern included in the flat cable may be broken, disrupting normal operation of the accessor robot.

It may be proposed that a check line formed of a conductor is provided in the flat cable independently of the signal line pattern, and a current is passed through the check line to detect a break in the check line according to the current, thereby electrically detecting damage to the flat cable. Accordingly, the accessor robot can be stopped immediately when a break in the check line is detected.

However, in a system configured so that the accessor robot is stopped suddenly upon detection of a break in the check line, the emergency stop of the accessor robot cannot be predicted. Accordingly, the accessor robot becomes suddenly inoperable, resulting in unavoidable stall or failure of the system, including the library apparatus.

The damage to the flat cable is considered to proceed gradually as the cable wears, so if the damage to the flat cable can be detected early, any protection such as replacement of the flat cable may be possible without unexpectedly stopping the accessor robot. Thus, early detection of the damage to the flat cable is considered very useful for prevention of system failure.

OBJECTS OF THE INVENTION

Accordingly, one object of this invention is to provide new and improved library apparatus.

Another object of the present invention to provide a new and improved library apparatus which can detect wear and damage to a flat cable connected to an accessor robot early.

Still another object of the invention is to provide new and improved library apparatus which can detect breakage of a flat cable connected to an accessor robot.

Other objects of the present invention will become apparent from the following description.

SUMMARY OF THE INVENTION

The library apparatus according to the present invention includes a cell unit, a drive unit, an accessor robot, and a flat cable. The cell unit has a plurality of cells each for storing a cartridge in which a recording medium is contained. The drive unit performs processing on the recording medium. The accessor robot transfers the cartridge between the cell unit and the drive unit. The flat cable has a first end and a second end. The first end is connected to the accessor robot, and the second end is fixed to a reference position (e.g., a housing of the library apparatus).

In accordance with a first aspect of the present invention, the flat cable includes at least one dedicated electrical check line, and preferably includes outer and inner check lines, each formed of an electrical conductor. Further, a circuit for detecting a break in each of the check lines used is connected to the first of the check lines used, and additional check lines, if used.

For example, if the flat cable is wrapped around a cable drum, it is expected that the flat cable starts to be damaged from its opposite side edges, due to normal wear and tear. Accordingly, by adopting the dedicated check line according to the first aspect of the present invention, damage to the flat cable can be detected by a break in the check lines.

In accordance with a second aspect of the present invention, the flat cable includes a pair of patterns each formed of a resistor. The two patterns are short-circuited at a plurality of positions spaced in a longitudinal direction of the pair of patterns. A current is passed between two terminal positions of the pair of patterns and a change in voltage drop between the two terminal positions is detected.

With this configuration, when one of the pair of patterns is broken, the voltage drop between the two terminal positions changes. Accordingly, by detecting the change in the voltage drop, damage to the flat cable can be detected early.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DESCRIPTION OF THE PREFERRED EMBODIMENTS

Figure 1:
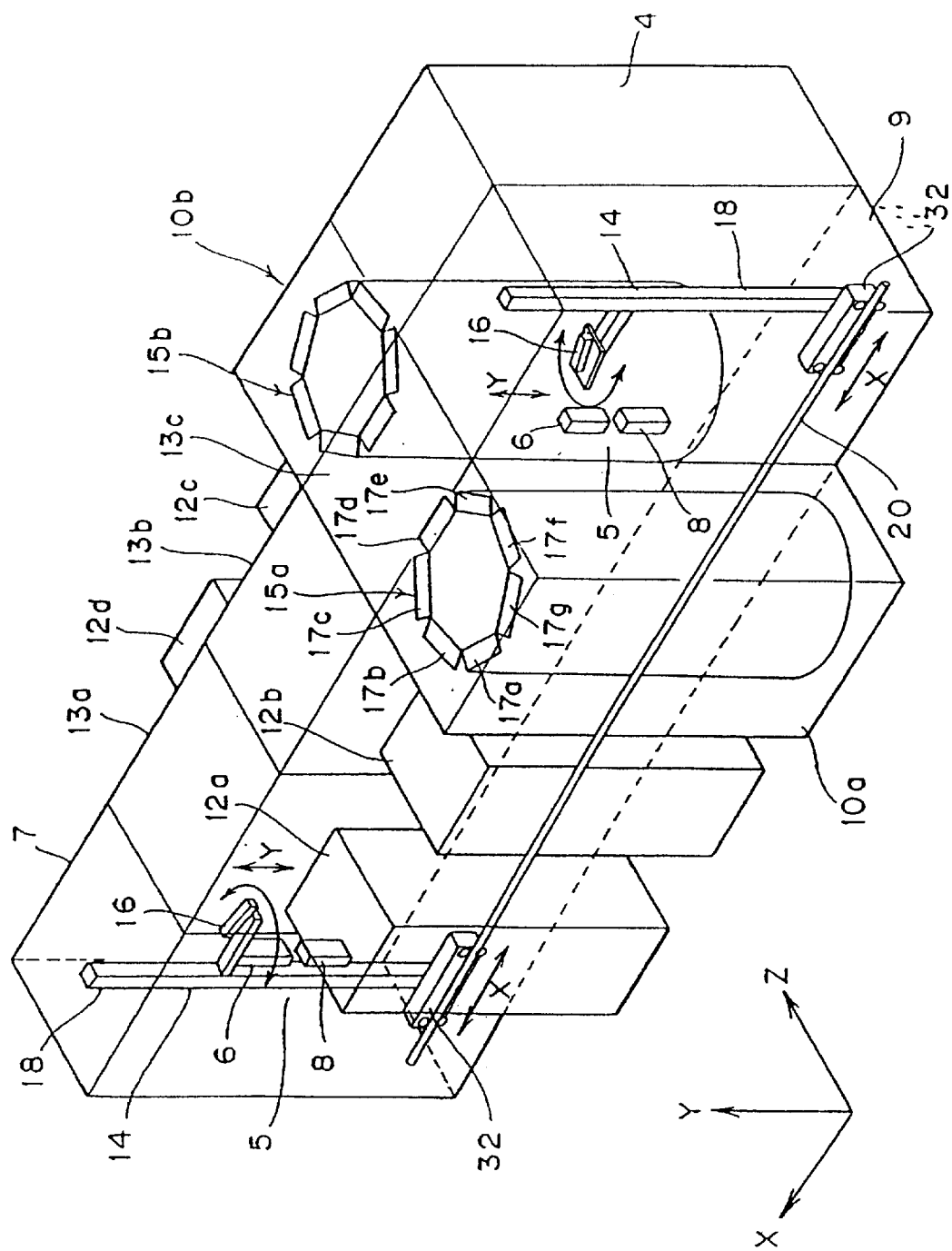
FIG. 1 is a perspective view showing a preferred embodiment of the library apparatus to which the present invention is applied.

FIG. 1 is a perspective view showing a preferred embodiment of the library apparatus according to the present invention. The library apparatus includes two accessor units 7 and 9, three passage units 13a, 13b, and 13c provided between the accessor units 7 and 9, four drive units 12a, 12b, 12c, and 12d, two drum units 10a and 10b provided along the passage units 13a, 13b, and 13c, and a control unit 4 provided corresponding to the accessor unit 9. Each unit may be expansively arranged according to a storage capacity.

Each of the accessor units 7 and 9 has a cartridge access station (CAS) 5 on the front side. Each cartridge access station 5 has a cartridge insertion opening 6 and a cartridge ejection opening 8, both are rotatable 180° about their respective vertical axes. A rail 20 defining an X-axis extends between the accessor units 7 and 9. In this specification, the X-axis is defined as a horizontal direction, a Y-axis is defined as a vertical direction, and a Z-axis is defined as a direction perpendicular to the X-axis and the Y-axis.

This library apparatus further includes one or more accessor robots 14 movable along the rail 20. In FIG. 1, two accessor robots 14 are normally located on standby in the accessor units 7 and 9. Each accessor robot 14 has a rail base 32 movable along the rail 20, a vertical column 18 fixed to the rail base 32, and a hand assembly 16 movable in the Y-axis direction along the vertical column 18. Accordingly, the hand assembly 16 is movable in the X-axis direction and the Y-axis direction.

The drum units 10a and 10b respectively have cell drums 15a and 15b each having a plurality of cells. Each of the cell drums 15a and 15b has seven cell segments 17a to 17g. Each of the cell segments 17a to 17g has three-row n-column cells. Each cell is adapted to store a cartridge containing a magnetic tape. This cartridge is an 13480 type magnetic tape cartridge, for example.

Each of the drive units 12a, 12b, 12c, and 12d has a plurality of (e.g., four) tape drives. Each tape drive has a cartridge insertion/ejection opening, and performs recording/reproduction of information on the magnetic tape contained in the cartridge inserted from the cartridge insertion/ejection opening.

The accessor robot 14 moves by itself and drives its own hand assembly 16 to thereby transfer the cartridge among each cartridge access station 5, each cartridge insertion/ejection opening of the tape drives, and each cell of the cell drums 15a and 15b. A printed circuit board including a control circuit for controlling this operation and its related operation (which will be hereinafter described in detail) is provided in the control unit 4.

Figure 2:
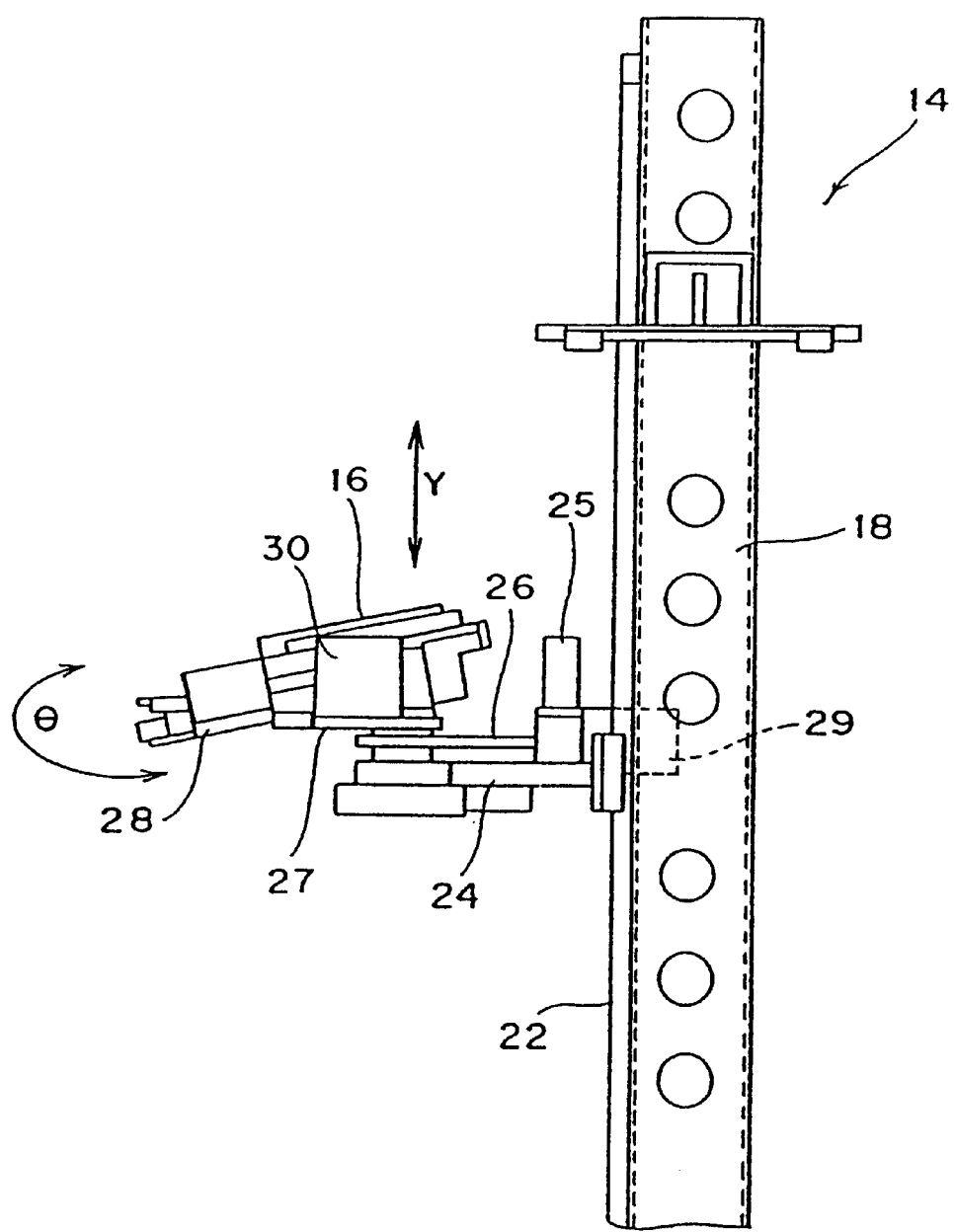
FIG. 2 is a side view of an upper portion of an accessor robot shown in FIG. 1.

FIG. 2 is a side view of an upper portion of each accessor robot 14 shown in FIG. 1. The hand assembly 16 is mounted on a support base 24 vertically movable along a guide rail 22 formed on the vertical column 18. Further mounted on the support base 24 are a motor 25 and a printed circuit board 29 for a control circuit for controlling the motor 25. The support base 24 is guided by the guide rail 22 and moved in the Y-axis direction together with the motor 25 and the printed circuit board 29.

When the motor 25 is driven, a mount base 27 for the hand assembly 16 is rotated as shown by an arrow about a vertical axis (an axis parallel to the Y-axis) by a timing belt 26 connected to the output shaft of the motor 25. That is, the motor 25, the hand assembly 16, and the mount base 27 constitute a mechanism for moving the cartridge in the θ direction.

Figure 3:
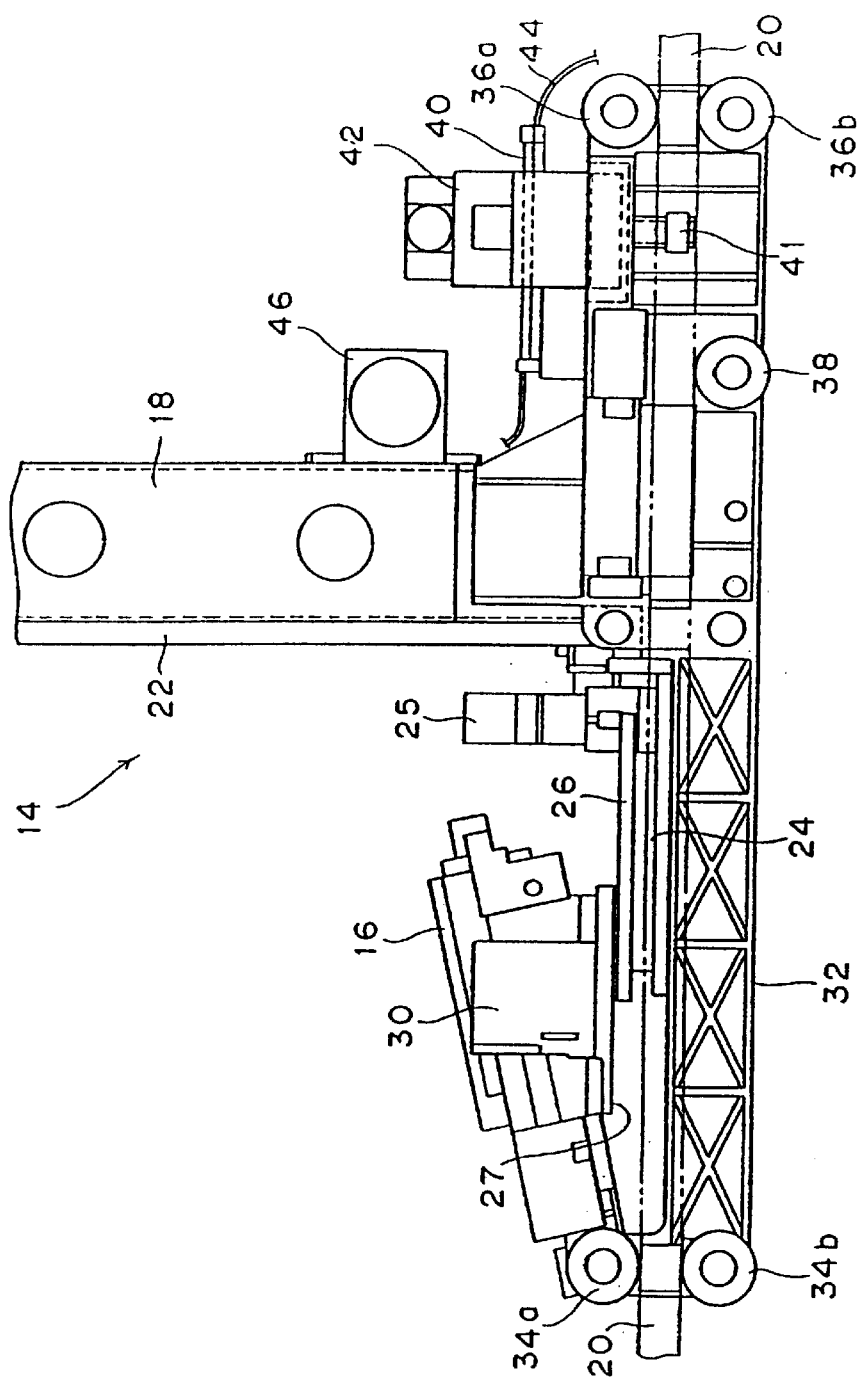
FIG. 3 is a side view of a mechanism for moving the accessor robot in an X-axis direction.

FIG. 3 is a side view illustrating a mechanism for moving each accessor robot 14 shown in FIG. 1 in the X-axis direction. A Y-axis motor 46 for moving the support base 24 back and forth along the guide rail 22 is supported to the vertical column 18. The vertical column 18 is supported to the rail base 32. A pair of rollers 34a and 34b and a pair of rollers 36a and 36b are rotatably supported to the rail base 32. The rollers 34a and 34b hold the rail 20 therebetween at one end of the rail base 32, and the rollers 36a and 36b hold the rail 20 therebetween at the other end of the rail base 32. Another roller 38 is also supported to the rail base 32 so as to be kept in contact with the rail 20.

By adjusting a contact force between the roller 38 and the rail 20, a frictional force between the rail base 32 and the rail 20 can be adjusted.

An X-axis motor 42 is provided to move the rail base 32 along the rail 20. The motor 42 is fixed on the rail base 32. A pinion 41 is fixed to the output shaft of the motor 42 and is in mesh with a rack (not shown) mounted on a housing to which the rail 20 is fixed.

A printed circuit board 40 for a control circuit for controlling the Y-axis motor 46 and the X-axis motor 42 is fixed on the rail base 32. The printed circuit board 40 is connected to a control device provided in the control unit 4 (see FIG. 1) by a flat cable 44 to be hereinafter described in detail. The flat cable 44 is provided by an elastically deformable flat cable composed of a plurality of electric wires arranged in parallel and an insulating cover for insulating the electric wires, for example.

Figure 4:
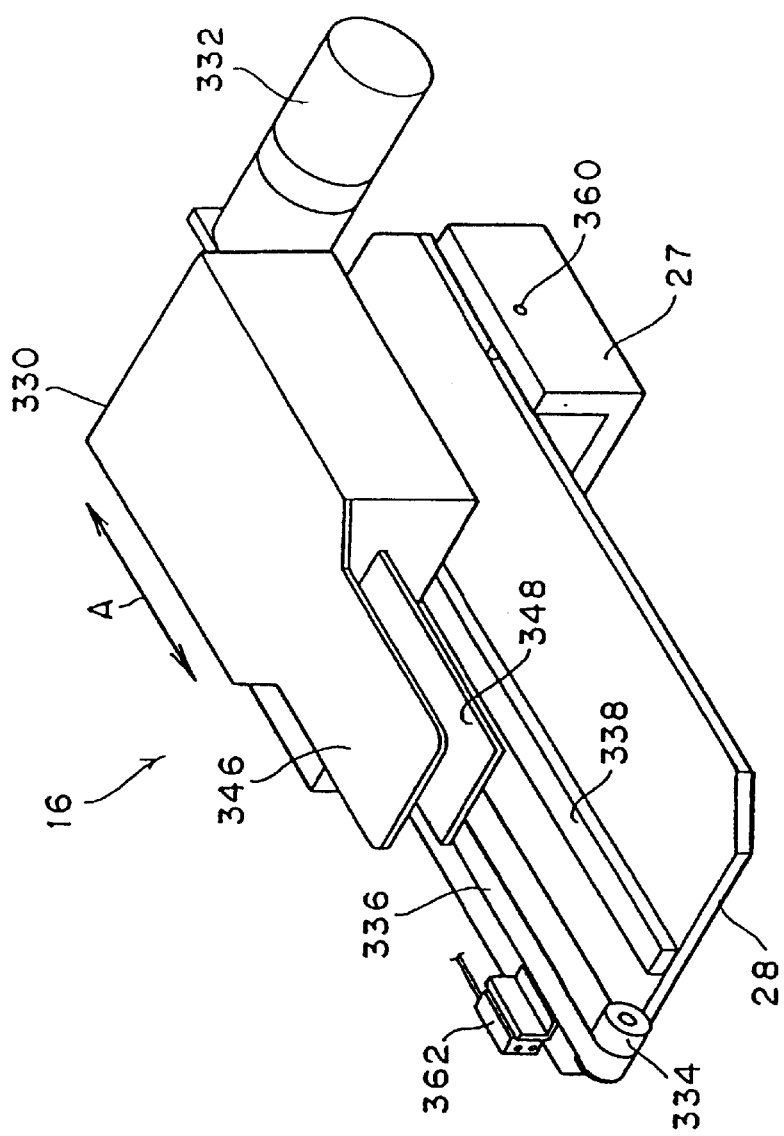
FIG. 4 is a schematic perspective view of a hand assembly shown in FIG. 1.

FIG. 4 is a schematic perspective view of the hand assembly 16 shown in FIG. 1. The hand assembly 16 is provided with a base 28. A hand unit 330 having an upper hand 346 and a lower hand 348 is mounted on the base 28 so as to be movable between an advanced position and a retracted position. The base 28 is provided so as to be pivotable about a horizontal shaft 360 supported to the mount base 27. A motor (not shown) for swinging the base 28 about the horizontal shaft 360 is mounted on the mount base 27.

A motor 332 for moving the hand unit 330 is mounted on the base 28 at its rear end portion. A pulley (not shown) is fixed to the output shaft of the motor 332. A pulley 334 is rotatably mounted on the base 28 at its front end portion. A timing belt 336 is wrapped between the pulley fixed to the output shaft of the motor 332 and the pulley 334. The timing belt 336 is connected to the hand unit 330.

When the motor 332 is driven, a driving force of the motor 332 is transmitted through the timing belt 336 to the hand unit 330, thereby moving the hand unit 330. The hand unit 330 makes a sliding motion between the advanced position and the retracted position along a guide rail 338 provided on the base 28. Because the timing belt 336 is connected to the hand unit 330, the hand unit 330 is driven by the motor 332 through the timing belt 336 and guided by the rail 338 to be moved there along between the advanced position and the retracted position as shown by an arrow A.

A sensor 362 is provided at the front end of the base 28 of the hand assembly 16. The sensor 362 is used to detect whether or not a cartridge is present in each cell.

In the library apparatus shown in FIG. 1, the accessor robots 14 for performing a specific operation are used as described above, thereby transferring the cartridge among each cartridge access station 5, each cell of the cell drums 15a and 15b, and each cartridge insertion/ejection opening of the magnetic tape drives of the drive units 12a to 12d. The access to each cell of the cell drums 15a and 15b may be made by rotational positioning of each cell drum, movement of the hand assembly 16 in the Y-axis direction, and rotation of the hand assembly 16 in the θ direction.

There will now be described a feeder mechanism characteristic of this preferred embodiment. This feeder mechanism is applied to each accessor robot 14 of the library apparatus shown in FIG. 1.

Figure 5:
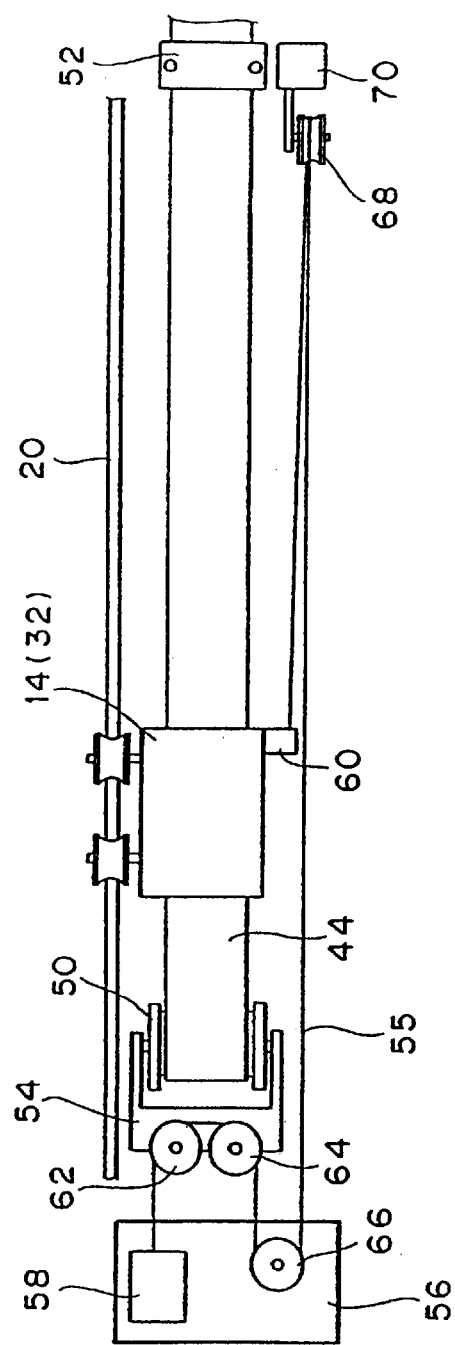
FIG. 5 is a plan view of a feeder mechanism applied to the library apparatus shown in FIG. 1.
Figure 6:
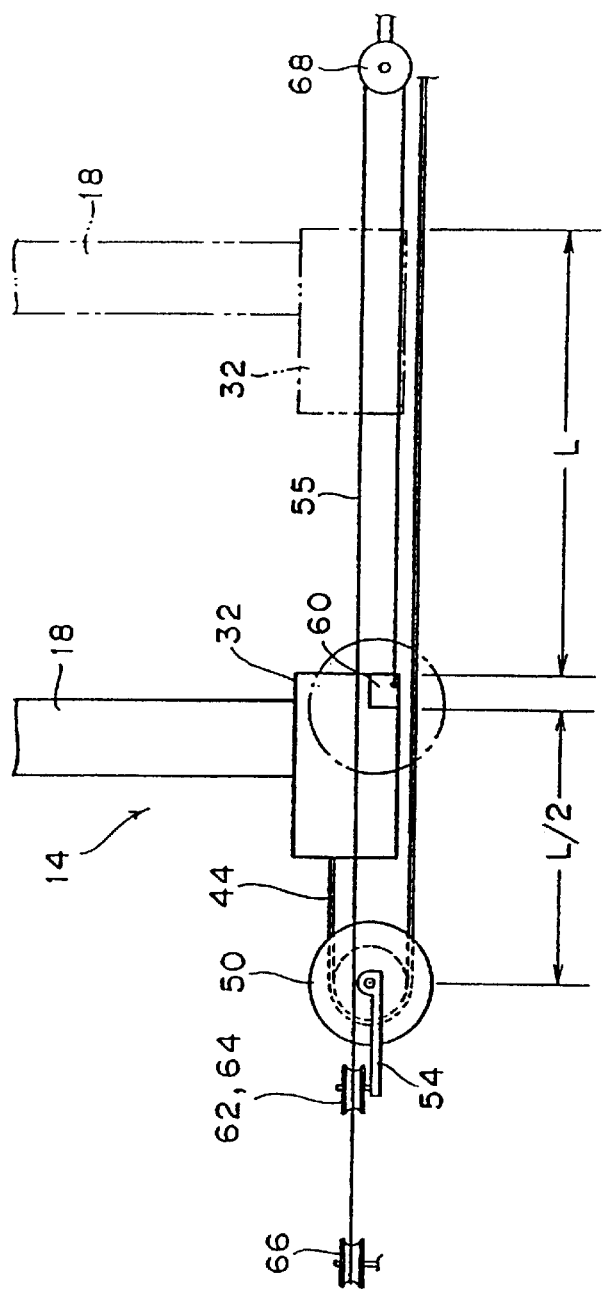
FIG. 6 is a side view for illustrating the operation of the feeder mechanism shown in FIG. 5.

FIG. 5 is a plan view of this feeder mechanism, and FIG. 6 is a side view for illustrating the operation of the feeder mechanism. The flat cable 44 is used to transfer a control signal between the accessor robot 14 and an external circuit (e.g., a circuit in the control unit 4 shown in FIG. 1) and/or supply electric power to the accessor robot 14. The flat cable 44 is fixed at its one end to the rail base 32 of the accessor robot 14 and fixed at the other end to the housing of the library apparatus by means of a fastener 52. The flat cable 44 is wrapped 180° around a cable drum 50 movable in the X-axis direction along the rail 20 together with the accessor robot 14. Accordingly, the fixed position of the flat cable 44 defined by the fastener 52 is a reference position of the feeder mechanism.

The cable drum 50 is rotatably supported by a U-shaped arm 54. To always apply a predetermined tension to the flat cable 44, a wire rope 55 acting on the arm 54 is used.

One end of the wire rope 55 is connected to a winding mechanism 58 provided on a pulley support 56 fixed to the housing, and the other end of the wire rope 55 is connected through a torsional stress removing mechanism 60 to the rail base 32 of the accessor robot 14. The removing mechanism 60 rotatably supports the wire rope 55 to thereby remove a torsional stress of the wire rope 55 and improve a fatigue characteristic of the wire rope 55.

To wrap the wire rope 55, the two idler pulleys 62 and 64 are rotatably supported to the arm 54, and a stationary pulley 66 is rotatably supported to the pulley support 56. Further, another stationary pulley 68 is rotatably supported to a pulley support 70 located in the vicinity of the fastener 52. The pulley support 70 is fixed to the housing. Accordingly, the stationary pulleys 66 and 68 are fixed with respect to the reference position.

The pulleys 62, 64, and 66 have rotating shafts parallel to the Y-axis, and the cable drum 50 and the pulley 68 have rotating shafts parallel to the Z-axis.

The wire rope 55 is wrapped 90° around each of the idler pulleys 62 and 64, that is, wrapped 180° totally around the idler pulleys 62 and 64, further wrapped 180° around the stationary pulley 66, and further wrapped 180° around the stationary pulley 68. According to the configuration of this feeder mechanism, when the accessor robot 14 is driven to move a distance L in the X-axis direction as shown in FIG. 6, the cable drum 50 and the arm 54 follow the movement of the accessor robot 14 to move a distance L/2 in the same direction. During this movement, a fixed tension is kept applied to the flat cable 44 by the wire rope 55, so that the flat cable 44 is prevented from slacking to thereby always allow good feeding irrespective of the position of the accessor robot 14 along the X-axis.

In this preferred embodiment, at least one idler pulley (the pulleys 62 and 64) is provided on the arm 54 and at least two stationary pulleys (the pulleys 66 and 68) are fixed with respect to the reference position are used, and the wire rope 55 is wrapped around these pulleys. Accordingly, the tension of the wire rope 55 can always be applied to the arm 54, thereby applying a fixed tension to the flat cable 44 irrespective of the position of the accessor robot 14.

The flat cable 44 tends to be long and complex. The complexity of the flat cable 44 is mainly due to the fact that the flat cable 44 includes a plurality of control signal lines and a plurality of motor drive lines. For example, the flat cable 44 has a width of about 170 mm and a length of about 35 m depending on the scale of the library apparatus.

As shown in FIGS. 5 and 6, the flat cable 44 is wrapped around the cable drum 50, so that when the cable drum 50 is rotated in the condition that the opposite side edges of the flat cable 44 are in contact with flanges formed at the opposite ends of the cable drum 50, it is expected that the flat cable 44 may start to be damaged from either side edge, through normal wear and tear, or abnormal events.

To cope with this problem, this preferred embodiment provides a specific structure of the flat cable 44 and an electrical circuit for detecting damage to the flat cable 44 in the periphery of the feeder mechanism shown in FIGS. 5 and 6, thereby allowing early detection of damage to the flat cable 44. This configuration will now be described more specifically.

Figure 7:
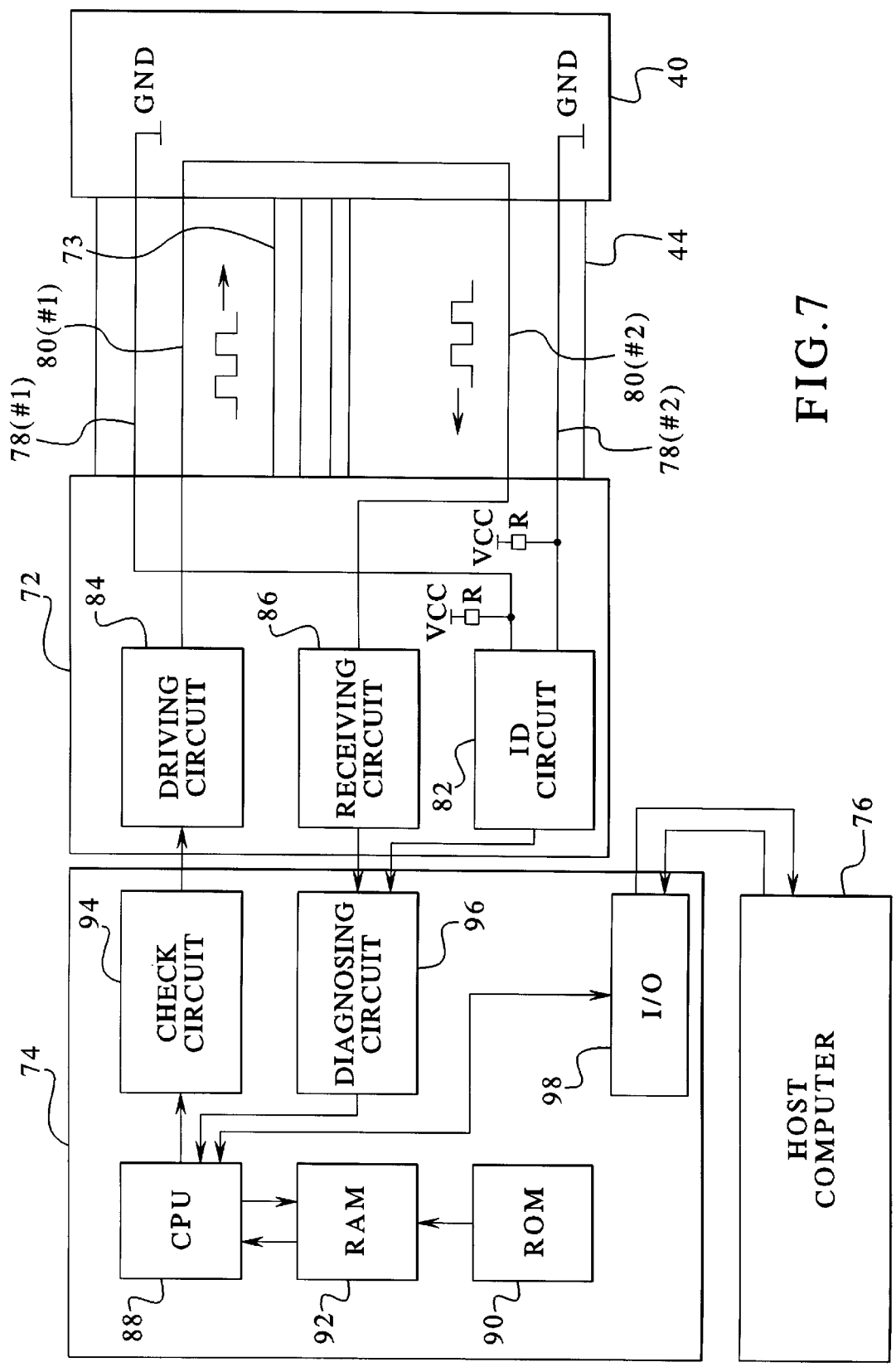
FIG. 7 is a block diagram showing a first preferred embodiment of the electrical circuit provided in the periphery of the feeder mechanism.

FIG. 7 is a block diagram showing a first preferred embodiment of the electrical circuit provided in the periphery of the feeder mechanism. One end of the flat cable 44 is electrically and mechanically connected to the printed wiring board 40 of the accessor robot 14 (see FIG. 3), and the other end of the flat cable 44 is electrically connected to a printed wiring board 72 fixed with respect to the reference position in the vicinity of the fastener 52 (see FIG. 5). Alternatively, the other end of the flat cable 44 may be electrically and mechanically connected to the printed wiring board 72 without using the fastener 52. The connection of electrical conductors 73 at each of the opposite ends of the flat cable 44 may be made by a connector or soldering. 20 The printed wiring board 72 is connected to a controlling printed wiring board 74 provided in the control unit 4. The printed wiring board 74 is connected to a host computer 76 as an external device or a host device for this library apparatus.

In the first preferred embodiment, any number of dedicated electrical lines could be used. For descriptive purposes, the first preferred embodiment will be described using outer and inner check lines. The first outer check line 78 (#1), formed of an electrical conductor, is provided in the vicinity of one side edge of the flat cable 44, and the first inner check line 80 (#1), formed of an electrical conductor, is provided inside the outer check line 78 (#1) in a substantially parallel relationship therewith. Another outer check line 78 (#2) and another inner check line 80 (#2) respectively corresponding to the outer check line 78 (#1) and the inner check line 80 (#1) are provided in the vicinity of the other side edge of the flat cable 44. Of course, individual inner and outer checks could also be used.

The electrical conductors 73 include a plurality of control signal lines and a plurality of motor drive lines provided between the inner check lines 80 (#1 and #2). These lines may become totally tens of lines.

Each of the outer check lines 78 (#1 and #2) is grounded on the printed wiring board 40, and connected to an identifying circuit 82 and through a resistor R to a power supply line VCC on the printed wiring board 72. The identifying circuit 82 is provided to detect a break in each of the outer check lines 78 (#1 and #2).

For example, in the case that the outer check line 78 (#1) has no breaks, the voltage level of the outer check line 78 (#1) detected by the identifying circuit 82 becomes almost equal to a ground potential, whereas in the case that the outer check line 78 (#1) has a break, the voltage level of the outer check line 78 (#1) detected by the identifying circuit 82 becomes almost equal to a potential at the power supply line VCC. Accordingly, by preliminarily setting a suitable threshold level in the identifying circuit 82, a break in the outer check line 78 (#1) can be detected. Based on a similar principle, a break in the outer check line 78 (#2) can be detected by the identifying circuit 82.

The inner check lines 80 (#1 and #2) are short-circuited on the printed wiring board 40, and connected to a signal driving circuit 84 and a receiving circuit 86 on the printed wiring board 72, respectively.

The signal driving circuit 84 transmits a check signal having a pulse waveform, for example, to the inner check line 80 (#1), and the signal receiving circuit 86 receives the check signal returned through the inner-check line 80 (#2).

If none of the inner check lines 80 (#1 and #2) has a break, the signal receiving circuit 86 can receive a check signal, whereas if at least one of the inner check lines 80 (#1 and #2) has a break, the signal receiving circuit 86 cannot receive a check signal. Accordingly, by determining whether or not the check signal output from the signal driving circuit 84 coincides with the check signal received by the signal receiving circuit 86, a break in the inner check line 80 (#1 or #2) can be detected.

Such a break detecting method using a specific check signal is hardly affected by noise, and also hardly affected by a short circuit to other lines, thereby allowing break detection with high reliability.

To carry out the break detection according to a program by firmware, there are provided on the printed wiring board 74 a CPU (central processing unit) 88 for executing computation or the like based on the program, a ROM (read-only memory) 90 preliminarily storing data for execution of the program, and a RAM (random access memory) 92 for temporarily storing data or the like on computation results. The ROM 90 may be replaced by another storage such as a floppy disk drive.

The data from the ROM 90 is once loaded into the RAM 92 according to an instruction from the CPU 88, and data transfer between the CPU 88 and the RAM 92 is sequentially performed to thereby execute the program.

For example, a check signal generating circuit 94 generates a check signal required by the signal driving circuit 84, according to an instruction from the CPU 88. Further, a diagnosing circuit 96 diagnoses a voltage level detected by the identifying circuit 82 and whether or not the signal receiving circuit 86 has received a check signal, and then supplies the result of this diagnosis to the CPU 88.

The CPU 88 is connected through an I/O port (input/output port) 98 to the host computer 76 by means of a bidirectional data bus.

Figure 8:
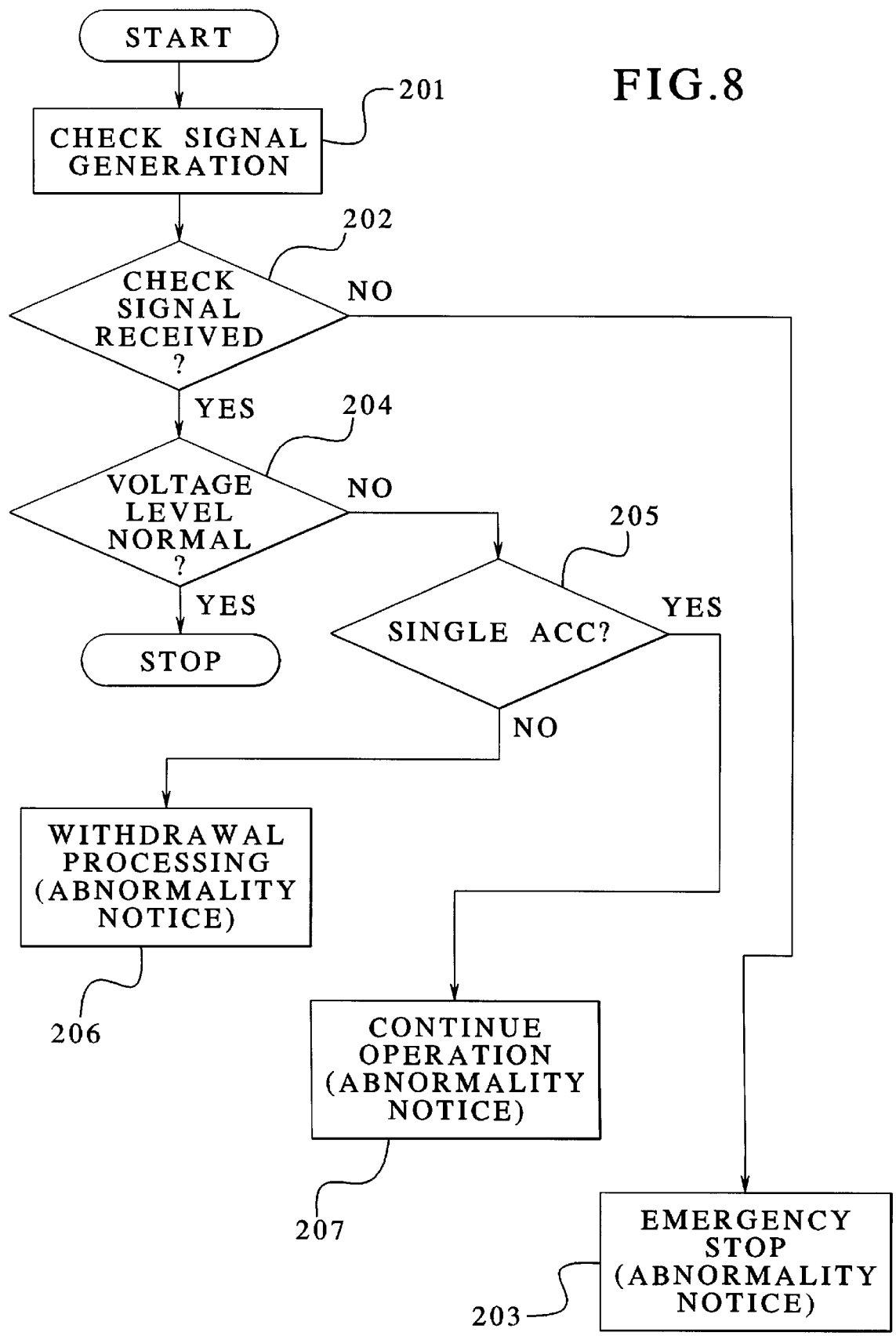
FIG. 8 is a flowchart showing the operation of the first preferred embodiment shown in FIG. 7.

FIG. 8 is a flowchart showing the operation of the first preferred embodiment shown in FIG. 7. The operation of the first preferred embodiment will now be described with reference to FIGS. 7 and 8.

When this flow is periodically started by the firmware, the check signal generating circuit 94 generates a check signal according to an instruction from the CPU 88 (step 201). The check signal generated is transmitted to the inner check line 80 (#1) by the signal driving circuit 84.

In step 202, the diagnosing circuit 96 determines whether or not the signal receiving circuit 86 has received a check signal from the inner check line 80 (#2). If the check signal received by the signal receiving circuit 86 is not coincident with the check signal output from the signal driving circuit 84, the program proceeds to step 203. In step 203, the accessor robot 14 is immediately stopped to suspend all controls. At the same time, the host computer 76 is informed of this abnormal state to execute error reporting.

If it is determined in step 202 that the check signal received by the signal receiving circuit 86 is coincident with the check signal output from the signal driving circuit 84, the program proceeds to step 204. In step 204, the diagnosing circuit 96 determines whether or not the voltage level detected by the identifying circuit 82 is normal. The state that "the voltage level is normal" means the state that "the voltage level detected is almost equal to a ground potential".

If the voltage level is normal, this flow is ended, whereas if the voltage level is abnormal, the program proceeds to step 205. In step 205, it is determined whether or not the accessor robot (ACC) 14 being used is single. If the accessor robot 14 is not single, e.g., if two accessor robots 14 are used as shown in FIG. 1, the program proceeds to step 206.

In step 206, withdrawal processing is executed for the accessor robot 14 whose abnormality has been detected after the current processing is terminated. At the same time, the host computer 76 is informed of this abnormal state and then informs an operator through a log that the flat cable 44 or the like for the abnormal accessor robot 14 must be checked/replaced.

If it is determined in step 205 that the accessor robot 14 being used is single, the program proceeds to step 207. In step 207, withdrawal processing is not executed for this accessor robot 14, but the current operation is continued. At the same time, the host computer 76 is informed of this abnormal state and then informs the operator through a log that the flat cable 44 or the like must be checked/replaced.

That is, in step 207 the flat cable 44 or the like for the abnormal accessor robot 14 is kept waiting for checking/replacement, and the current operation of the abnormal accessor robot 14 can be continued until a break in the inner check line 80 (#1 or #2) is detected.

If the outer check lines 78 (#1 and #2) are absent as in the prior art, for example, the steps 204 to 207 cannot be executed. Accordingly, the abnormal accessor robot 14 is stopped suddenly, which creates a possibility of system failure as mentioned above.

According to this preferred embodiment, the outer check lines 78 (#1 and #2) are provided in the flat cable 44 near its opposite side edges, and a break in at least one of these lines is detected. Accordingly, damage to the flat cable 44 which tends to start from its either side edge can be detected early, thereby preventing system failure.

Particularly in this preferred embodiment, the voltage levels of the outer check lines 78 (#1 and #2) on the printed wiring board 72 can be detected independently of each other. Accordingly, it is possible to also detect which of the opposite side edges of the flat cable 44 has started to be damaged.

Figure 9:
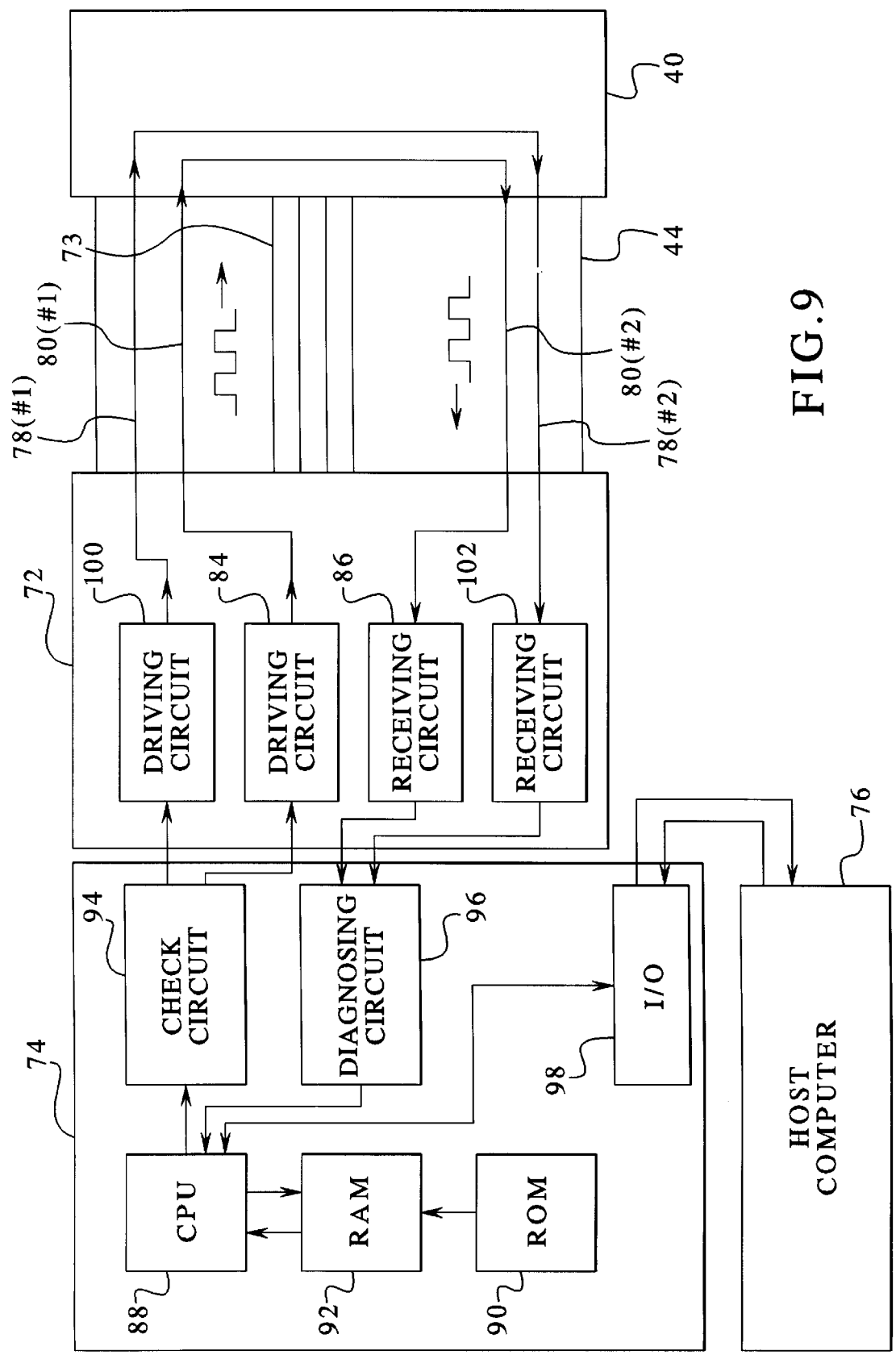
FIG. 9 is a block diagram showing a second preferred embodiment of the electrical circuit provided in the periphery of the feeder mechanism.

FIG. 9 is a block diagram showing a second preferred embodiment of the electrical circuit provided in the periphery of the feeder mechanism. In contrast with the first preferred embodiment shown in FIG. 7 wherein a break in each of the outer check lines 78 (#1 and #2) is detected according to the voltage level in each outer check line, the second preferred embodiment is characterized in that a break in each of the outer check lines 78 (#1 and #2) is detected by using a check signal as similar to the break detection for the inner check lines 80 (#1 and #2).

In this preferred embodiment, any of the dedicated electrical line, first and second check lines, or outer and inner check lines can be used. For ease of explanation, outer and inner check lines will be used. The outer check lines 78 (#1 and #2) are short-circuited on the printed wiring board 40, and connected to a signal driving circuit 100 and a signal receiving circuit 102 on the printed wiring board 72, respectively. The signal driving circuit 100 and the signal receiving circuit 102 may be provided like the signal driving circuit 84 and the signal receiving circuit 86, respectively. Further, the diagnosing circuit 96 is modified so that it can support a result of detection from the signal receiving circuit 102.

Figure 10:
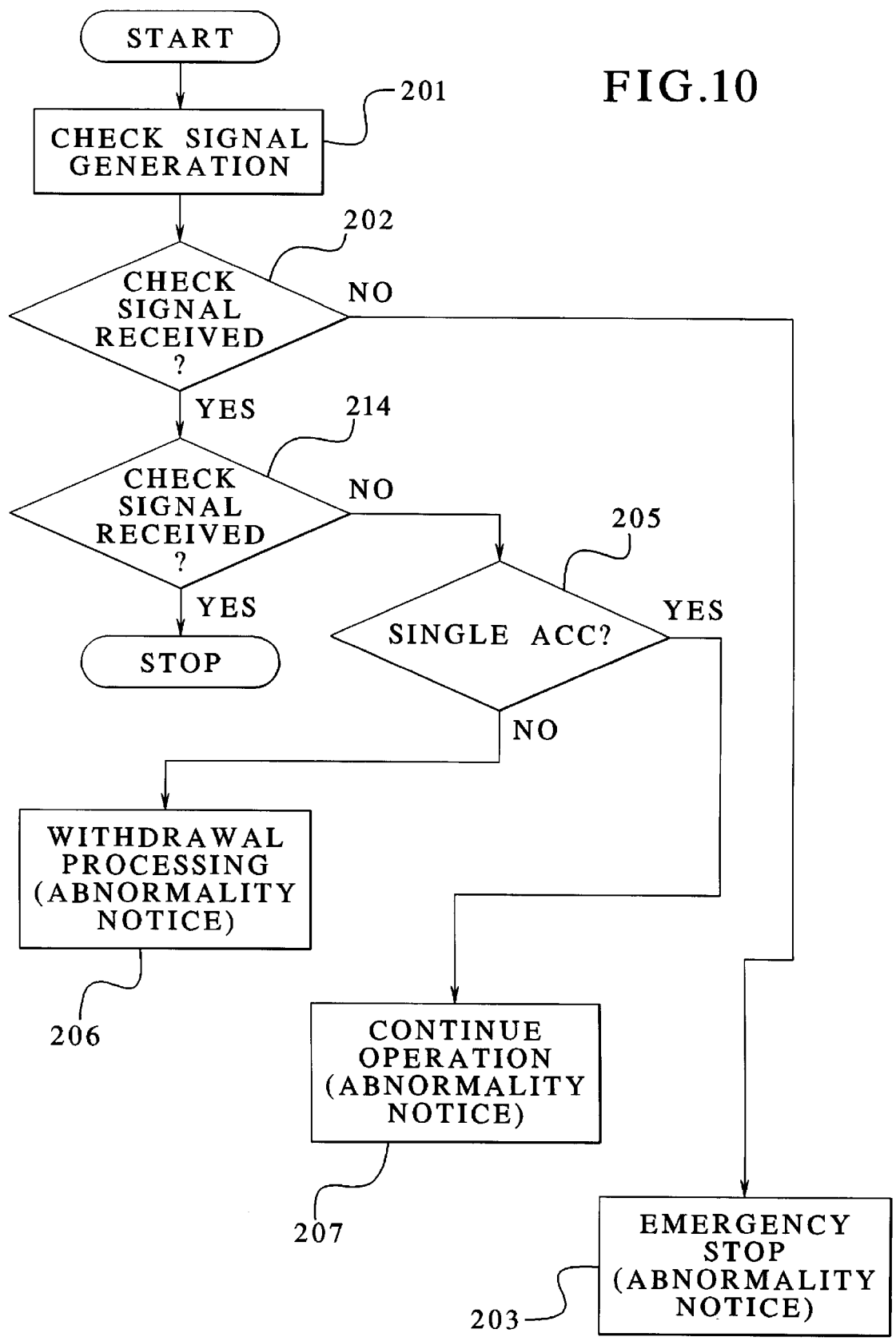
FIG. 10 is a flowchart showing the operation of the second preferred embodiment shown in FIG. 9.

FIG. 10 is a flowchart showing the operation of the second preferred embodiment shown in FIG. 9. In association with the use of the signal driving circuit 100 and the signal receiving circuit 102 for the outer check lines 78 (#1 and #2), step 204 in the first preferred embodiment of FIG. 8 is replaced by step 214.

That is, after checking the coincidence of the check signals on the inner check lines 80 (#1 and #2) in step 202, it is determined in step 214, whether or not the check signal received by the signal receiving circuit 102 coincides with the check signal output from the signal driving circuit 100.

If the check signals on the outer check lines 78 (#1 and #2) coincide with each other, this flow is ended, whereas if it is not so, the program proceeds to step 205.

The advantage by the operation shown in FIG. 10 is understandable in accordance with the advantage by the operation shown in FIG. 8, so the description thereof will be omitted herein.

Although which of the outer check lines 78 (#1 and #2) has a break cannot be specified in the second preferred embodiment shown in FIG. 9, the break detection of the outer check lines 78 (#1 and #2) is hardly affected by noise or the like, thereby improving the reliability of the break detection.

The above two preferred embodiments were described using outer and inner check lines. This description is only an example and should not limit the apparatus to outer and inner check lines, but should be known to also be able to include any dedicated check line, including first and second check lines.

Figure 11:
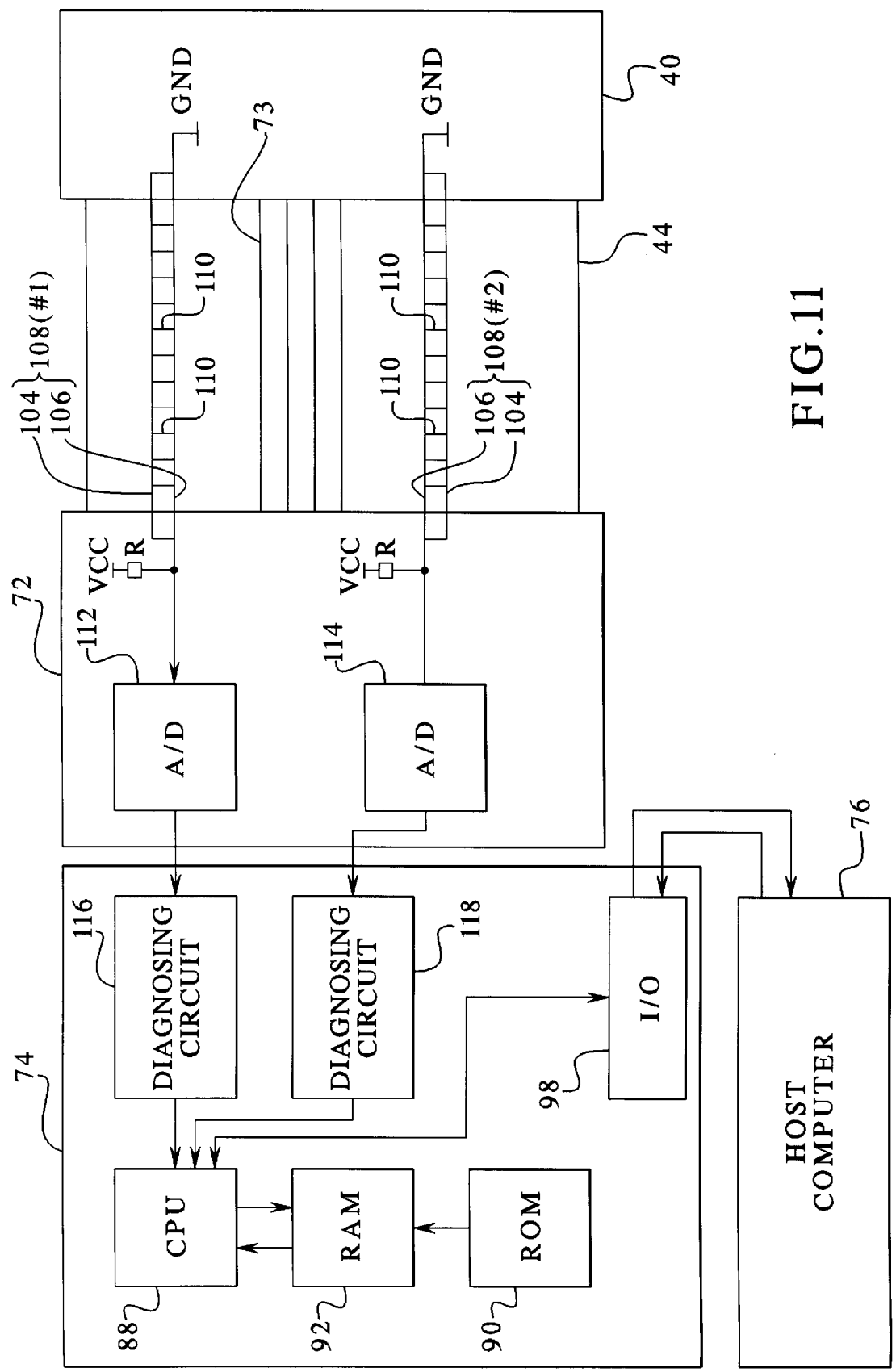
FIG. 11 is a block diagram showing a third preferred embodiment of the electrical circuit provided in the periphery of the feeder mechanism.

FIG. 11 is a block diagram showing a third preferred embodiment of the electrical circuit provided in the periphery of the feeder mechanism. In this preferred embodiment, a pattern pair consisting of a pair of resistor patterns 104 and 106 is provided preferably in the vicinity of one side edge of the flat cable 44. The resistor patterns 104 and 106 are short-circuited by a plurality of conductor patterns 110 arranged in the longitudinal direction of the pattern pair 108 (#1).

Similarly, a pattern pair 108 (#2) consisting of a pair of resistor patterns 104 and 106 is provided preferably in the vicinity of the other side edge of the flat cable 44. The resistor patterns 104 and 106 of the pattern pair 108 (#2) are also short-circuited by a plurality of conductor patterns 110 arranged in the longitudinal direction of the pattern pair 108 (#2).

To pass a current through the pattern pair 108 (#1), the pattern pair 108 (#1) is grounded on the printed wiring board 40 and connected through a resistor R to a power supply line VCC on the printed wiring board 72. Further, to detect a change in voltage drop across the pattern pair 108 (#1), the pattern pair 108 (#1) is connected to an A/D (analog/digital) converter 112 on the printed wiring board 72. The A/D converter 112 converts a voltage level at one end of the resistor R connected to the pattern pair 108 into a digital logic signal.

Similarly, to pass a current through the pattern pair 108 (#2), the pattern pair 108 (#2) is grounded on the printed wiring board 40 and connected through a resistor R to a power supply line VCC. Further, to detect a change in voltage drop across the pattern pair 108 (#2), the pattern pair 108 (#2) is connected to an A/D converter 114 on the printed wiring board 72. The A/D converter 114 converts a voltage level at one end of the resistor R connected to the pattern pair 108 (#2) into a digital logic signal.

According to this preferred embodiment, the degree of damage to the flat cable 44 can be specified according to a condition of breaks in the pattern pairs 108 (#1 and #2). For example, in the case that the pattern pair 108 (#1) has a complete break, that is, in the case that both the resistor patterns 104 and 106 of the pattern pair 108 (#1) have breaks, the voltage level detected by the A/D converter 112 is almost equal to the voltage level of the power supply line VCC. In the case that the pattern pair 108 (#1) has no breaks at any positions, the voltage level detected by the A/D converter 112 is almost equal to a predetermined value of the voltage drop according to the resistance across the pattern pair 108 (#1). Further, in the case that the damage to the flat cable 44 started from one side edge thereof proceeds to cause a break in the resistor pattern 104 in at least one position, while causing no breaks in the resistor pattern 106 at any positions, the resistance across the pattern pair 108

(#1) is increased and accordingly the voltage level detected by the A/D converter 112 approaches the voltage level of the power supply line VCC.

More specifically, let r (including a unit Ω) denote the resistance in each segment of the resistor patterns 104 and 106 defined between the adjacent conductor patterns 110, and n denote the number of segments of each of the resistor patterns 104 and 106. In the case that none of the resistor patterns 104 and 106 has a break, the resistance across the pattern pair 108 (#1) becomes nr/2. To the contrary, in the case that one of the segments of the resistor pattern 104, for example, has a break, the resistance across the pattern pair 108 (#1) becomes (n+1)r/2. Further, in the case that two of the segments of the resistor pattern 104 has breaks, the resistance across the pattern pair 108 (#1) becomes (n+2)r/2. Similarly, the resistance across the pattern pair 108 (#1) increases with an increase in the number of segments having breaks. In this manner, by detecting the resistance, the number of segments having breaks can be specified and accordingly the degree of damage to the flat cable 44 can be specified.

Also, by using the pattern pair 108 (#2), the degree of damage to the flat cable 44 can be specified in a manner similar to that by the pattern pair 108 (#1).

Furthermore, according to this preferred embodiment, a break in any one of the segments of each resistor pattern can be detected, thereby allowing early detection of damage to the flat cable 44.

Further, since the pattern pairs 108 (#1 and #2) are provided in the vicinity of the opposite side edges of the flat cable 44, which of the opposite side edges of the flat cable 44 has started to be damaged can be detected.

To specify the presence or absence of a break in each of the pattern pairs 108 (#1 and #2) and the degree of damage to the flat cable 44 in accordance with a predetermined rule, output signals from the A/D converters 112 and 114 are supplied to diagnosing circuits 116 and 118, respectively, and output signals from the diagnosing circuits 116 and 118 are supplied to the CPU 88.

Figure 12:
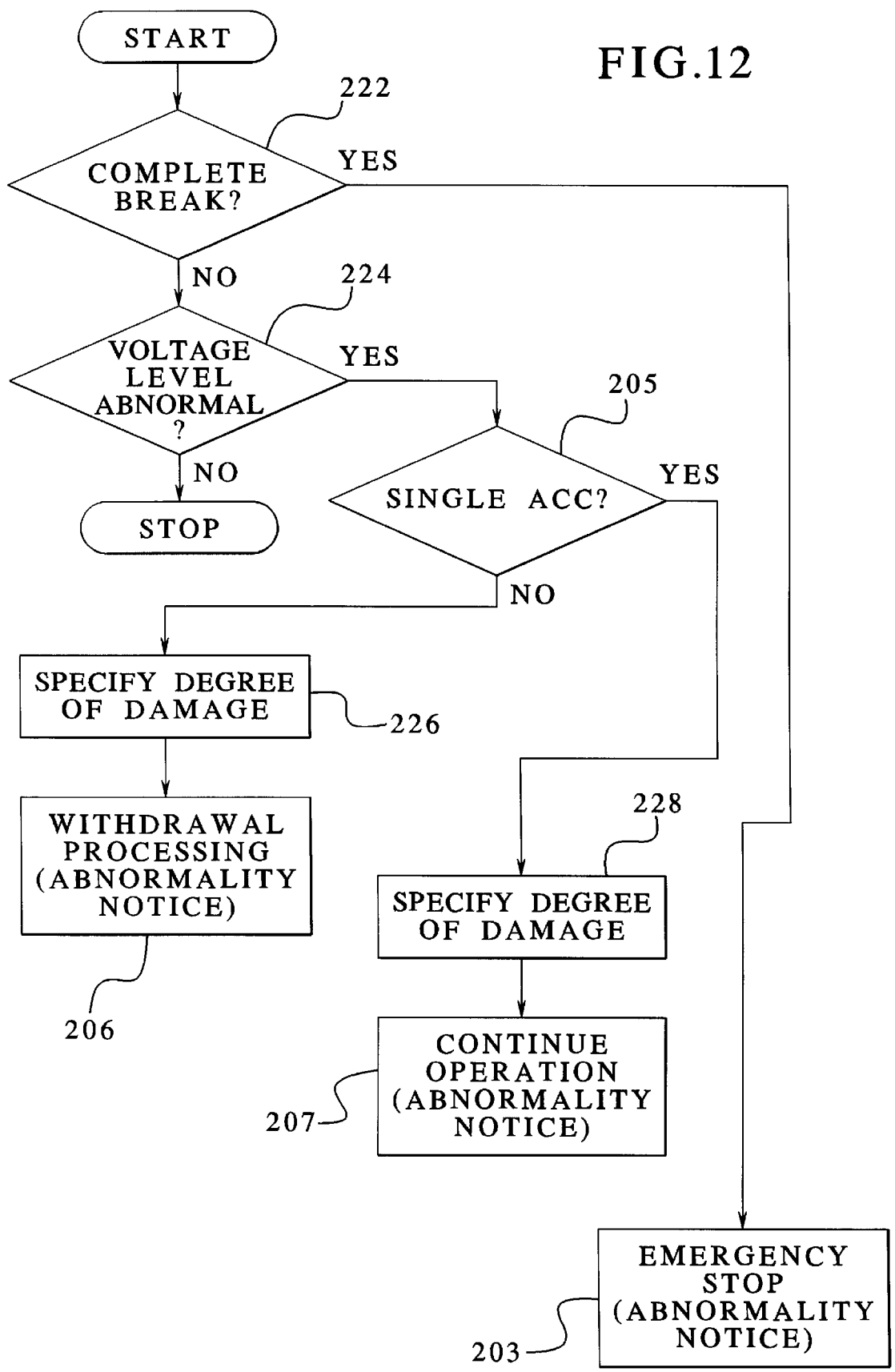
FIG. 12 is a flowchart showing the operation of the third preferred embodiment shown in FIG. 11.

FIG. 12 is a flowchart showing the operation of the third preferred embodiment shown in FIG. 11. In this preferred embodiment, no check signals are used for the break detection. Accordingly, step 201 shown in FIG. 8 is omitted, and steps 202 and 204 shown in FIG. 8 are replaced by steps 222 and 224, respectively.

In step 222, it is determined whether or not at least one of the pattern pairs 108 (#1 and #2) has a complete break. If the answer in step 222 is YES, the program proceeds to step 203, whereas if the answer in step 222 is NO, the program proceeds to step 224. In step 224, it is determined whether or not at least one segment of the resistor pattern 104 in each of the pattern pairs 108 (#1 and #2) has a break, that is, whether or not the voltage level detected by each of the A/D converters 112 and 114 is abnormal. If the voltage level is abnormal, the program proceeds to step 205, whereas if the voltage level is not abnormal, this flow is ended.

Particularly in this preferred embodiment, a degree of damage to the flat cable 44 can be specified. Accordingly, step 226 for specifying the degree of damage is provided between step 205 and step 206, and step 228 for specifying the degree of damage is provided between step 205 and step 207.

In step 226, data on a degree of damage to the flat cable 44 for the abnormal accessor robot 14 is recorded into the RAM 92, for example, whereby the degree of damage can be recognized from the data recorded in the RAM 92 on the accessor robot 14 subjected to withdrawal processing.

On the other hand, in step 228, data on the degree of damage to the flat cable 44 for the abnormal accessor robot 14 is recorded into the RAM 92, for example, and the data is updated sequentially. Preferably, the operator is sequentially informed of the updated data through a log. The reason is that in step 207, subsequent to step 228, the operation of the accessor robot 14 whose flat cable 44 is being damaged must be continued.

Figure 13:
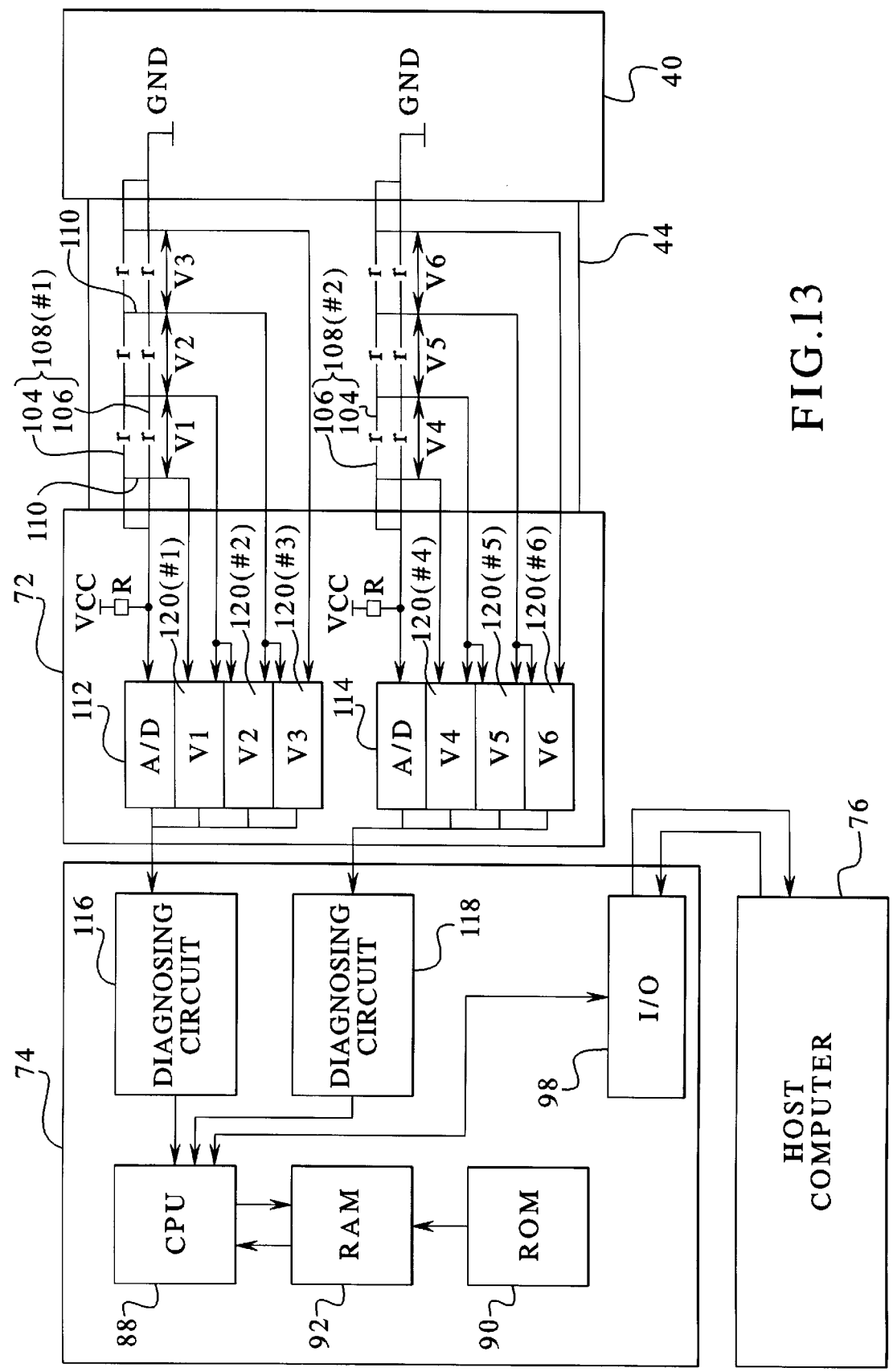
FIG. 13 is a block diagram showing a fourth preferred embodiment of the electrical circuit provided in the periphery of the feeder mechanism.

FIG. 13 is a block diagram showing a fourth preferred embodiment of the electrical circuit provided in the periphery of the feeder mechanism. In contrast with the third preferred embodiment shown in FIG. 11, the fourth preferred embodiment is characterized in that a plurality of voltage detecting circuits 120 (#1 to #6) each for detecting a change in voltage drop between two adjacent short-circuited positions in each of the pattern pairs 108 (#1 and #2) are additionally provided.

In FIG. 13, three segments of each of the resistor patterns 104 and 106 are shown, for example.

A voltage drop V1 across the segment pair of the pattern pair 108 (#1) nearest to the printed wiring board 72 is detected by the detecting circuit 120 (#1). A voltage drop V2 across the central segment pair of the pattern pair 108 (#1) is detected by the detecting circuit 120 (#2). A voltage drop V3 across the segment pair of the pattern pair 108 (#1) nearest to the printed wiring board 40 is detected by the detecting circuit 120 (#3).

Further, a voltage drop V4 across the segment pair of the pattern pair 108 (#2) nearest to the printed wiring board 72 is detected by the detecting circuit 120 (#4). A voltage drop V5 across the central segment pair of the pattern pair 108 (#2) is detected by the detecting circuit 120 (#5). A voltage drop V6 across the segment pair of the pattern pair 108 (#2) nearest to the printed wiring board 40 is detected by the detecting circuit 120 (#6).

Output signals from the detecting circuits 120 (#1 to #6) are input through the diagnosing circuits 116 and 118 into the CPU 88.

When the resistance across each segment pair is changed by a break or the like in the corresponding outer segment, the voltage drop across this segment pair changes. Accordingly, by using the detecting circuits 120 (#1 to #6) to detect such a change in the voltage drop, a position where the damage to the flat cable 44 proceeds can be specified.

Figure 14:
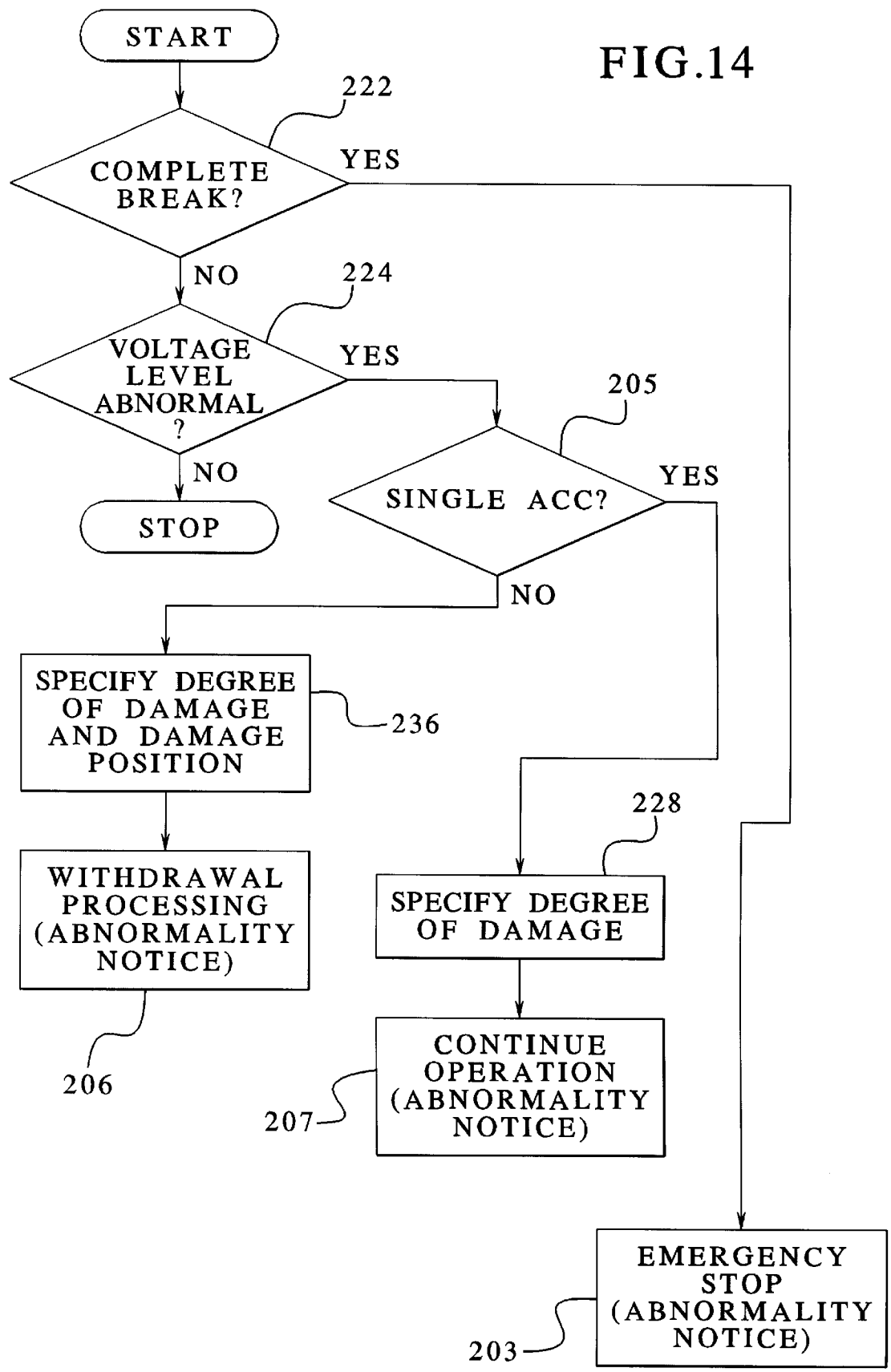
FIG. 14 is a flowchart showing the operation of the fourth preferred embodiment shown in FIG. 13.

FIG. 14 is a flowchart showing the operation of the fourth preferred embodiment shown in FIG. 13. In this flowchart, step 236 is provided in place of step 216 shown in FIG. 12. That is, not only the degree of damage to the flat cable 44 but also the damage position in the flat cable 44 for the accessor robot 14 subjected to withdrawal processing can be specified.

Also in step 228, the damage position may be additionally specified to follow sequential updating of data on the damage position.

As described above, according to the present invention, it is possible to provide a library apparatus which can detect damage to a flat cable connected to an accessor robot early. Other effects obtained by the specific preferred embodiments of the present invention have been described, so the description thereof will be omitted herein.

While the principles of the invention have been described above in connection with specific apparatus and applications, it is to be understood that this description is made only by way of example and not as a limitation on the scope of the invention.

I claim:

1. A library apparatus comprising:
   a cell unit having a plurality of cells each for storing a cartridge in which a recording medium is contained;
   a drive unit for performing processing on said recording medium;
   an accessor robot for transferring said cartridge between said cell unit and said drive unit;
   a flat cable having a first end and a second end, said first end being connected to said accessor robot, said second end being fixed to a reference position, said flat cable including electrical conductors which cause failure of the library apparatus if sufficiently damaged; and
   means for detecting damage to said flat cable before the library apparatus fails due to sufficiently damaged said electrical conductors.

2. A library apparatus according to claim 1 wherein said damage detecting means includes at least one dedicated electrical line in said flat cable, and circuit means connected to said dedicated line for detecting damage to said dedicated line.

3. A library apparatus according to claim 2, wherein said circuit means includes an identification circuit for detecting a change in voltage caused by damage in said dedicated line.

4. A library apparatus according to claim 2, wherein said circuit means provides a pulse signal to said dedicated line and measures the pulse signal to detect damage to said dedicated line.

5. A library apparatus according to claim 2, wherein said damage detecting means includes a first check line and a second check line in said flat cable, and said circuit means includes an identification circuit for detecting a change in voltage caused by damage in said first check line, said circuit means further providing a pulse signal to said second check line and measuring said pulse signal to detect damage in said second check line.

6. A library apparatus according to claim 1, wherein said damage detecting means includes an outer check line and an inner check line in said flat cable, first circuit means which provides a voltage to at least a selected one of said outer check line and said inner check line and detects changes in the voltage caused by damage to said selected check line, and second circuit means which provides a pulse signal to the other of said outer check line and said inner check line and measures the pulse signal to detect damage to said other check line.

7. A library apparatus according to claim 1, wherein said detecting means includes an outer check line and an inner check line in said flat cable, and a circuit means which provides a pulse signal to both the said outer check line and said inner check line and detects changes in the pulse signals caused by damage to said outer and inner check lines.

8. A library apparatus according to claim 1, further comprising:
   a cable drum for wrapping said flat cable there around;
   an arm for rotatably supporting said cable drum; and
   a wire rope acting on said arm to apply a tension to said flat cable.

9. A library apparatus according to claim 8, further comprising:
   at least one idler pulley provided on said arm; and
   at least two stationary pulleys fixed with respect to said reference position;
   one end of said wire rope being fixed with respect to said reference position, the other end of said wire rope being connected through said idler pulley and said stationary pulleys to said accessor robot.

10. A library apparatus comprising:
    a cell unit having a plurality of cells each for storing a cartridge in which a recording medium is contained;
    a drive unit for performing processing on said recording medium;
    an accessor robot for transferring said cartridge between said cell unit and said drive unit;
    a flat cable having a first end and a second end, said first end being connected to said accessor robot, said second end being fixed to a reference position, said flat cable including electrical conductors which cause failure of the library apparatus if sufficiently damaged, a pair of patterns each formed of a resistor, said pair of patterns being short-circuited at a plurality of positions spaced in a longitudinal direction of said pair of patterns;
    means for passing a current between two terminal positions of said pair of patterns of said flat cable; and
    means for measuring the current to detect damage to said flat cable before the library apparatus fails due to sufficiently damaged said electrical conductors.

11. A library apparatus according to claim 10, wherein said two terminal positions correspond to said first and second ends of said flat cable.

12. A library apparatus according to claim 10, wherein said pair of patterns are provided in the vicinity of each of opposite side edges of said flat cable.

13. A library apparatus according to claim 10, further comprising means for detecting a change in voltage drop between every two adjacent short-circuited positions of said plurality of positions on said pair of patterns.

14. A library apparatus according to claim 10, further comprising:
    a cable drum for wrapping said flat cable there around;
    an arm for rotatably supporting said cable drum; and
    a wire rope acting on said arm to apply a tension to said flat cable.

15. A library apparatus according to claim 14, further comprising:
    at least one idler pulley provided on said arm; and
    at least two stationary pulleys fixed with respect to said reference positions;
    one end of said wire rope being fixed with respect to said reference position, the other end of said wire rope being connected through said idler pulley and said stationary pulleys to said accessor robot.

* * * * *